US011900847B2

(12) United States Patent
Park et al.

(10) Patent No.: US 11,900,847 B2
(45) Date of Patent: Feb. 13, 2024

(54) DISPLAY APPARATUS AND METHOD OF DRIVING THE SAME

(71) Applicant: Samsung Display Co., Ltd., Yongin-Si (KR)

(72) Inventors: Sehyuk Park, Seongnam-si (KR); Jinyoung Roh, Hwaseong-si (KR); Woomi Bae, Daegu (KR); Hae-Kwan Seo, Hwaseong-si (KR); Youngha Sohn, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 11 days.

(21) Appl. No.: 17/939,018

(22) Filed: Sep. 7, 2022

(65) Prior Publication Data

US 2023/0127526 A1 Apr. 27, 2023

(30) Foreign Application Priority Data

Oct. 25, 2021 (KR) ........................ 10-2021-0142976

(51) Int. Cl.
*G09G 3/22* (2006.01)
*G09G 3/20* (2006.01)

(52) U.S. Cl.
CPC ... *G09G 3/2003* (2013.01); *G09G 2310/0275* (2013.01)

(58) Field of Classification Search
CPC ......... G09G 3/2003; G09G 2310/0275; H04N 13/324
See application file for complete search history.

(56) References Cited

U.S. PATENT DOCUMENTS

2019/0253697 A1* 8/2019 Kim ..................... H04N 13/324

FOREIGN PATENT DOCUMENTS

JP 2004-004725 A 1/2004

* cited by examiner

*Primary Examiner* — Abdul-Samad A Adediran
(74) *Attorney, Agent, or Firm* — Innovation Counsel LLP

(57) ABSTRACT

A display apparatus includes a display panel and a display driver. The display panel has a first pixel structure. The display driver is configured to receive input image data including first data, and generate a driving signal for driving the display panel based on conversion data. The display driver includes a converter configured to convert the first data into the conversion data. The conversion data include conversion data in N rows and M columns. Each of (2K−1)-th column conversion data include first color conversion data representing a first color and second color conversion data representing a second color. Each of 2K-th column conversion data include third color conversion data representing a third color and fourth color conversion data representing the second color. N, M and K are positive integers.

20 Claims, 13 Drawing Sheets

FIG. 5

| RGB DATA | | | | | | | | | | | | | | | | | |
|---|---|---|---|---|---|---|---|---|---|---|---|---|---|---|---|---|---|
| 1ST | R10 | G10 | B10 | R11 | G11 | B11 | R12 | G12 | B12 | R13 | G13 | B13 | R14 | G14 | B14 | ... |
| 2ND | R20 | G20 | B20 | R21 | G21 | B21 | R22 | G22 | B22 | R23 | G23 | B23 | R24 | G24 | B24 | ... |
| 3RD | R30 | G30 | B30 | R31 | G31 | B31 | R32 | G32 | B32 | R33 | G33 | B33 | R34 | G34 | B34 | ... |
| 4TH | R40 | G40 | B40 | R41 | G41 | B41 | R42 | G42 | B42 | R43 | G43 | B43 | R44 | G44 | B44 | ... |

FIG. 6

| CONVERTED DATA | | | | | | | | | | | |
|---|---|---|---|---|---|---|---|---|---|---|---|
| | 1ST | (R11+R11)/2 | G11 | (R11+R12)/2 | G11 | (B11+B12)/2 | G12 | (R13+R14)/2 | G13 | (B13+B14)/2 | G14 ... |
| | 2ND | (B21+B21)/2 | G21 | (R21+R22)/2 | G21 | (B22+B23)/2 | G22 | (R23+R24)/2 | G23 | (B24+B25)/2 | G24 ... |
| | 3RD | (R31+R31)/2 | G31 | (R31+R32)/2 | G31 | (B31+B32)/2 | G32 | (R33+R34)/2 | G33 | (B33+B34)/2 | G34 ... |
| | 4TH | (B41+B41)/2 | G41 | (R41+R42)/2 | G41 | (B42+B43)/2 | G42 | (R43+R44)/2 | G43 | (B44+B45)/2 | G44 ... |

FIG. 7

| | | | | | | |
|---|---|---|---|---|---|---|
| OUTPUT DATA | DL0 | B21 | B21 | B41 | B41 | ... |
| | DL1 | (R11+R12)/2 | (R21+R22)/2 | (R31+R32)/2 | (R41+R42)/2 | ... |
| | DL2 | G11 | G21 | G31 | G41 | ... |
| | DL3 | (B11+B12)/2 | (B22+B23)/2 | (B31+B32)/2 | (B42+B43)/2 | ... |
| | DL4 | G12 | G22 | G32 | G42 | ... |
| | DL5 | (R13+R14)/2 | (R23+R24)/2 | (R33+R34)/2 | (R43+R44)/2 | ... |
| | DL6 | G13 | G23 | G33 | G43 | ... |
| | DL7 | (B13+B14)/2 | (B24+B25)/2 | (B33+B34)/2 | (B44+B45)/2 | ... |
| | DL8 | G14 | G24 | G34 | G44 | ... |

FIG. 10

| | | | | | | | | | | | |
|---|---|---|---|---|---|---|---|---|---|---|---|
| CONVERTED DATA | 1ST | (R11+R11)/2 | G11 | (B11+B12)/2 | G11 | (R12+R13)/2 | G12 | (B13+B14)/2 | G13 | (R14+R15)/2 | G14 | ... |
| | 2ND | (B21+B21)/2 | G21 | (B21+B22)/2 | G21 | (R21+R22)/2 | G22 | (B23+B24)/2 | G23 | (R23+R24)/2 | G24 | ... |
| | 3RD | (R31+R31)/2 | G31 | (B31+B32)/2 | G31 | (R32+R33)/2 | G32 | (B33+B34)/2 | G33 | (R34+R35)/2 | G34 | ... |
| | 4TH | (B41+B41)/2 | G41 | (B41+B42)/2 | G41 | (R41+R42)/2 | G42 | (B43+B44)/2 | G43 | (R43+R44)/2 | G44 | ... |

FIG. 11

| | | | | | | |
|---|---|---|---|---|---|---|
| OUTPUT DATA | DL0 | R11 | R11 | R31 | R31 | ... |
| | DL1 | (B11+B12)/2 | (B21+B22)/2 | (B31+B32)/2 | (B41+B42)/2 | ... |
| | DL2 | G11 | G21 | G31 | G41 | ... |
| | DL3 | (R12+R13)/2 | (R21+R22)/2 | (R32+R33)/2 | (R41+R42)/2 | ... |
| | DL4 | G12 | G22 | G32 | G42 | ... |
| | DL5 | (B13+B14)/2 | (B23+B24)/2 | (B33+B34)/2 | (B43+B44)/2 | ... |
| | DL6 | G13 | G23 | G33 | G43 | ... |
| | DL7 | (R14+R15)/2 | (R23+R24)/2 | (R34+R35)/2 | (R43+R44)/2 | ... |
| | DL8 | G14 | G24 | G34 | G44 | ... |

DISPLAY APPARATUS AND METHOD OF DRIVING THE SAME

PRIORITY STATEMENT

This application claims priority under 35 U.S.C. § 119 to Korean Patent Application No. 10-2021-0142976, filed on Oct. 25, 2021, in the Korean Intellectual Property Office KIPO, the contents of which are herein incorporated by reference in their entireties.

BACKGROUND

1. Field

Embodiments of the present inventive concept relate to a display apparatus. More particularly, embodiments of the present inventive concept relate to a display apparatus including an RGBG pixel structure and a method of driving the display apparatus.

2. Description of the Related Art

A display apparatus includes pixels. The pixel includes subpixels emitting lights having different colors to represent a full-color. For example, the pixel may include an R (red) subpixel, a G (green) subpixel and a B (blue) subpixel. In the display apparatus, the R subpixels, the G subpixels, and the B subpixels may be arranged in a stripe configuration in which subpixels of the same color are arranged in each column.

Recently, to increase a resolution of a display panel, a display apparatus having an RGBG pixel structure in which two adjacent pixels share a B subpixel and/or an R subpixel has been developed. In the display apparatus having the RGBG pixel structure, each pixel has two subpixels of a G subpixel and an R subpixel, or two subpixels of a G subpixel and a B subpixel so that a pixel size may be reduced so that the resolution of the display panel may be increased.

However, in a conventional display apparatus having the RGBG pixel structure, a process of data remapping to match input image data to the RGBG pixel structure may be required, so that a logic size of data operation may increase.

SUMMARY

Embodiments of the present inventive concept provide a display apparatus generating output data corresponding to a display panel by generating conversion data corresponding to an RGBG pixel structure without data rearrangement (or data remapping) of the conversion data.

Embodiments of the present inventive concept also provide a method of driving the display apparatus generating output data corresponding to a display panel by generating conversion data corresponding to an RGBG pixel structure without data rearrangement (or data remapping) of the conversion data.

In an embodiment of a display apparatus according to the present inventive concept, the display apparatus includes a display panel and a display driver. The display panel has a first pixel structure. The display driver is configured to receive input image data including first data, and generate a driving signal for driving the display panel based on conversion data. The display driver includes a converter configured to convert the first data into the conversion data. The conversion data include conversion data in N rows and M columns. Each of (2K−1)-th column conversion data include first color conversion data representing a first color and second color conversion data representing a second color. Each of 2K-th column conversion data include third color conversion data representing a third color and fourth color conversion data representing the second color. N, M and K are positive integers.

In an embodiment, the first pixel structure may be an RGBG pixel structure. The first data may be RGB data. The converter may be an RGB-RGBG converter.

In an embodiment, the first color conversion data may represent red. The second color conversion data may represent green. The third color conversion data may represent blue.

In an embodiment, the input image data may include second row dummy red data, second row dummy green data, second row dummy blue data, a second row and first column red data, a second row and first column green data, a second row and first column blue data, a second row and second column red data, a second row and second column green data, a second row and second column blue data, a second row and third column red data, a second row and third column green data, and a second row and third column blue data. The conversion data may include second row dummy blue conversion data generated based on the second row dummy blue data and the second row and first column blue data, and second row dummy green conversion data corresponding to the second row dummy green data, second row and first column red conversion data generated based on the second row and first column red data and the second row and second column red data, and second row and first column green conversion data corresponding to the second row and first column green data, second row and second column blue conversion data generated based on the second row and second column blue data and the second row and third column blue data, and second row and second column green conversion data corresponding to the second row and second column green data.

In an embodiment, the second row dummy blue conversion data may correspond to an average value of the second row dummy blue data and the second row and first column blue data. The second row and first column red conversion data may correspond to an average value of the second row and first column red data and the second row and second column red data. The second row and second column blue conversion data may correspond to an average value of the second row and second column blue data and the second row and third column blue data.

In an embodiment, the input image data may further include a first row dummy red data, a first row dummy green data, a first row dummy blue data, a first row and first column red data, a first row and first column green data, a first row and first column blue data, a first row and second column red data, a first row and second column green data, a first row and second column blue data, a first row and third column red data, a first row and third column green data, a first row and third column blue data, a first row and fourth column red data, a first row and fourth column green data and a first row and fourth column blue data. The conversion data may further include first row dummy red conversion data generated based on the first row dummy red data and the first row and first column red data and first row dummy green conversion data corresponding to the first row dummy green data, first row and first column red conversion data generated based on the first row and first column red data and the first row and second column red data and first row and first column green conversion data corresponding to the first row and first column green data, first row and second column blue conversion data generated based on the first row and first column blue data and the first row and second column blue data and first row and second column green conversion data corresponding to the first row and second column green data, and first row and third column red conversion data generated based on the first row and third column red data and the first row and fourth column red data.

In an embodiment, the first row dummy red conversion data may correspond to an average value of the first row dummy red data and the first row and first column red data. The first row and first column red conversion data may correspond to an average value of the first row and first column red data and the first row and second column red data. The first row and second column blue conversion data may correspond to an average value of the first row and first column blue data and the first row and second column blue data. The first row and third column red conversion data may correspond to an average value of the first row and third column red data and the first row and fourth column red data.

In an embodiment, the display panel may include a first row R dummy pixel, a second row B dummy pixel, a first row and first column R subpixel, a first row and first column G subpixel, a first row and second column B subpixel, a first row and second column G subpixel, a first row and third column R subpixel, a second row and first column B subpixel, a second row and first column G subpixel, a second row and second column R subpixel, a second row and second column G subpixel, and a second row and third column B subpixel.

In an embodiment, the display panel may further include a dummy data line connected to the first row R dummy pixel and the second row and first column B subpixel, and data lines that include a first data line connected to the first row and first column R subpixel and the second row and second column R subpixel, a second data line connected to the first row and first column G subpixel and the second row and first column G subpixel, a third data line connected to the first row and second column B subpixel and the second row and third column B subpixel and a fourth data line connected to the first row and second column G subpixel and the second row and second column G subpixel.

In an embodiment, the display driver may be configured to generate output data corresponding to the conversion data, and apply the output data to the subpixels of the display panel through the data lines.

In an embodiment, the output data corresponding to the first row and first column red conversion data may be applied to the first row and first column R subpixel. The output data corresponding to the first row and first column green conversion data may be applied to the first row and first column G subpixel. The output data corresponding to the first row and second column blue conversion data may be applied to the first row and second column B subpixel. The output data corresponding to the first row and second column green conversion data may be applied to the first row and second column G subpixel. The output data corresponding to the first row and third column red conversion data may be applied to the first row and third column R subpixel. The output data corresponding to the second row dummy blue conversion data may be applied to the second row and first column B subpixel. The output data corresponding to the second row and first column green conversion data may be applied to the second row and first column G subpixel. The output data corresponding to the second row and first column red conversion data may be applied to the second row and second column R subpixel. The output data corresponding to the second row and second column green conversion data may be applied to the second row and second column G subpixel. The output data corresponding to the second row and second column blue conversion data may be applied to the second row and third column B subpixel.

In an embodiment, the first color conversion data may represent blue. The second color conversion data may represent green. The third color conversion data may represent red.

In an embodiment, the input image data may include a first row dummy red data, a first row dummy green data, a first row dummy blue data, a first row and first column red data, a first row and first column green data, a first row and first column blue data, a first row and second column red data, a first row and second column green data, a first row and second column blue data, a first row and third column red data, a first row and third column green data, and a first row and third column blue data. The conversion data may include first row dummy red conversion data generated based on the first row dummy red data and the first row and first column red data, first row dummy green conversion data corresponding to the first row dummy green data, first row and first column blue conversion data generated based on the first row and first column blue data and the first row and second column blue data, first row and first column green conversion data corresponding to the first row and first column green data, first row and second column red conversion data generated based on the first row and second column red data and the first row and third column red data and first row and second column green conversion data corresponding to the first row and second column green data.

In an embodiment, the input image data may further include second row dummy red data, second row dummy green data, second row dummy blue data, a second row and first column red data, a second row and first column green data, a second row and first column blue data, a second row and second column red data, a second row and second column green data, a second row and second column blue data, a second row and third column red data, a second row and third column green data, a second row and third column blue data, a second row and fourth column red data, a second row and fourth column green data, and a second row and fourth column blue data. The conversion data may include second row dummy blue conversion data generated based on the second row dummy blue data and the second row and first column blue data, second row dummy green conversion data corresponding to the second row dummy green data, second row and first column blue conversion data generated based on the second row and first column blue data and the second row and second column blue data, second row and first column green conversion data corresponding to the second row and first column green data, second row and second column red conversion data generated based on the second row and first column red data and the second row and second column red data, second row and second column green conversion data corresponding to the second row and second column green data, and second row and third column blue conversion data generated based on the second row and third column blue data and the second row and fourth column blue data.

In an embodiment, the display panel may include a first row R dummy pixel, a second row B dummy pixel, a first row and first column R subpixel, a first row and first column G subpixel, a first row and second column B subpixel, a first row and second column G subpixel, a first row and third column R subpixel, a second row and first column B subpixel, a second row and first column G subpixel, a second row and second column R subpixel, a second row and second column G subpixel, and a second row and third column B subpixel.

In an embodiment, the display panel may further include a dummy data line connected to the first row and first column R subpixel and the second row B dummy pixel, and data lines that include a first data line connected to the first row and second column B subpixel and the second row and first column B subpixel, a second data line connected to the first row and first column G subpixel and the second row and first column G subpixel. a third data line connected to the first row and third column R subpixel and the second row and second column R subpixel and a fourth data line connected to the first row and second column G subpixel and the second row and second column G subpixel.

In an embodiment, the display driver may be configured to generate output data corresponding to the conversion data, and apply the output data to the subpixels of the display panel through the data lines.

In an embodiment, the output data corresponding to the first row dummy red conversion data may be applied to the first row and first column R subpixel. The output data corresponding to the first row and first column green conversion data may be applied to the first row and first column G subpixel. The output data corresponding to the first row and first column blue conversion data may be applied to the first row and second column B subpixel. The output data corresponding to the first row and second column green conversion data may be applied to the first row and second column G subpixel. The output data corresponding to the first row and second column red conversion data may be applied to the first row and third column R subpixel. The output data corresponding to the second row and first column blue conversion data may be applied to the second row and first column B subpixel. The output data corresponding to the second row and first column green conversion data may be applied to the second row and first column G subpixel. The output data corresponding to the second row and second column red conversion data may be applied to the second row and second column R subpixel. The output data corresponding to the second row and second column green conversion data may be applied to the second row and second column G subpixel. The output data corresponding to the second row and third column blue conversion data may be applied to the second row and third column B subpixel.

In an embodiment of a method of driving a display apparatus according to the present inventive concept, the method includes receiving input image data including first data, converting the first data into conversion data, generating output data based on the conversion data and applying the output data to a display panel to display an image. The conversion data include conversion data in N rows and M columns. Each of (2K−1)-th column conversion data include first color conversion data representing a first color and second color conversion data representing a second color. Each of 2K-th column conversion data include third color conversion data representing a third color and fourth color conversion data representing the second color. N, M and K are positive integers.

In an embodiment, the input image data may include second row dummy red data, second row dummy green data, second row dummy blue data, a second row and first column red data, a second row and first column green data, a second row and first column blue data, a second row and second column red data, a second row and second column green data, a second row and second column blue data, a second row and third column red data, a second row and third column green data, and a second row and third column blue data. The conversion data may include second row dummy blue conversion data generated based on the second row dummy blue data and the second row and first column blue data and second row dummy green conversion data corresponding to the second row dummy green data, second row and first column red conversion data generated based on the second row and first column red data and the second row and second column red data and second row and first column green conversion data corresponding to the second row and first column green data, second row and second column blue conversion data generated based on the second row and second column blue data and the second row and third column blue data and second row and second column green conversion data corresponding to the second row and second column green data.

In an embodiment, the input image data may further include a first row dummy red data, a first row dummy green data, a first row dummy blue data, a first row and first column red data, a first row and first column green data, a first row and first column blue data, a first row and second column red data, a first row and second column green data, a first row and second column blue data, a first row and third column red data, a first row and third column green data, a first row and third column blue data, a first row and fourth column red data, a first row and fourth column green data and a first row and fourth column blue data. The conversion data may further include first row dummy red conversion data generated based on the first row dummy red data and the first row and first column red data and first row dummy green conversion data corresponding to the first row dummy green data, first row and first column red conversion data generated based on the first row and first column red data and the first row and second column red data and first row and first column green conversion data corresponding to the first row and first column green data, first row and second column blue conversion data generated based on the first row and first column blue data and the first row and second column blue data and first row and second column green conversion data corresponding to the first row and second column green data, and first row and third column red conversion data generated based on the first row and third column red data and the first row and fourth column red data.

In an embodiment, the display panel may include a first row R dummy pixel, a second row B dummy pixel, a first row and first column R subpixel, a first row and first column G subpixel, a first row and second column B subpixel, a first row and second column G subpixel, a first row and third column R subpixel, a second row and first column B subpixel, a second row and first column G subpixel, a second row and second column R subpixel, a second row and second column G subpixel, and a second row and third column B subpixel.

According to the display apparatus and the method of driving the display apparatus, the display apparatus may generate the output data corresponding to the display panel by generating the conversion data corresponding to the RGBG pixel structure without data rearrangement (or data remapping) of the conversion data. Thus, a logic size for data operation may be reduced in the display apparatus so that a power consumption of the display apparatus may be reduced and a data operation time of the display apparatus may be decreased. Therefore, a display quality of the display panel may be enhanced.

However, the effects of the present inventive concept are not limited to the above-described effects, and may be variously expanded without departing from the spirit and scope of the present inventive concept.

BRIEF DESCRIPTION OF THE DRAWINGS

The above and other features and advantages of the present inventive concept will become more apparent by describing in detailed embodiments thereof with reference to the accompanying drawings, in which:

FIG. 5 is a diagram illustrating an example of input image data including RGB data according to the embodiment of FIG. 4;

FIG. 6 is a diagram illustrating an example of conversion data generated from the input image data of FIG. 5;

FIG. 7 is a diagram illustrating an example of output data generated from the conversion data of FIG. 6;

FIG. 10 is a diagram illustrating an example of conversion data generated from the input image data of FIG. 9;

FIG. 11 is a diagram illustrating an example of output data generated from the conversion data of FIG. 10;

DETAILED DESCRIPTION OF THE INVENTIVE CONCEPT

Hereinafter, the present inventive concept will be explained in detail with reference to the accompanying drawings.

Figure 1:
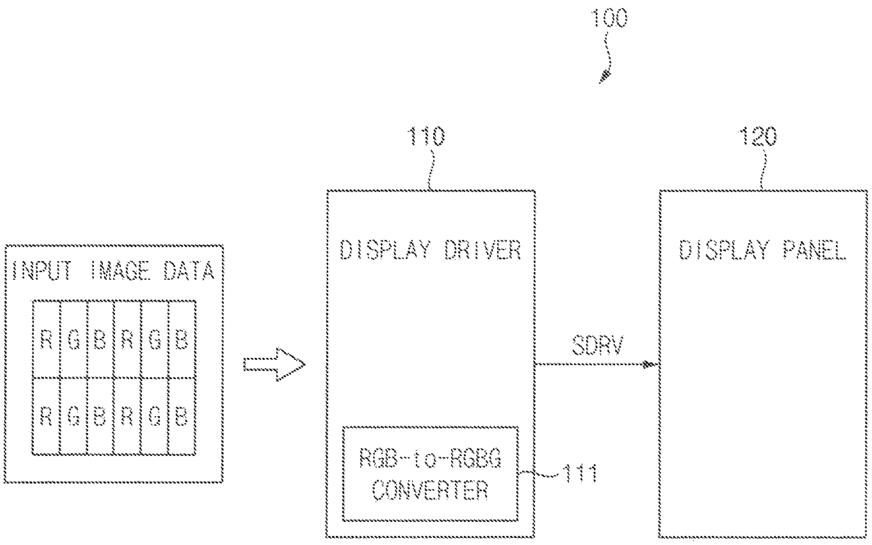
FIG. 1 is a diagram illustrating a display apparatus according to an embodiment of the present inventive concept.
Figure 2:
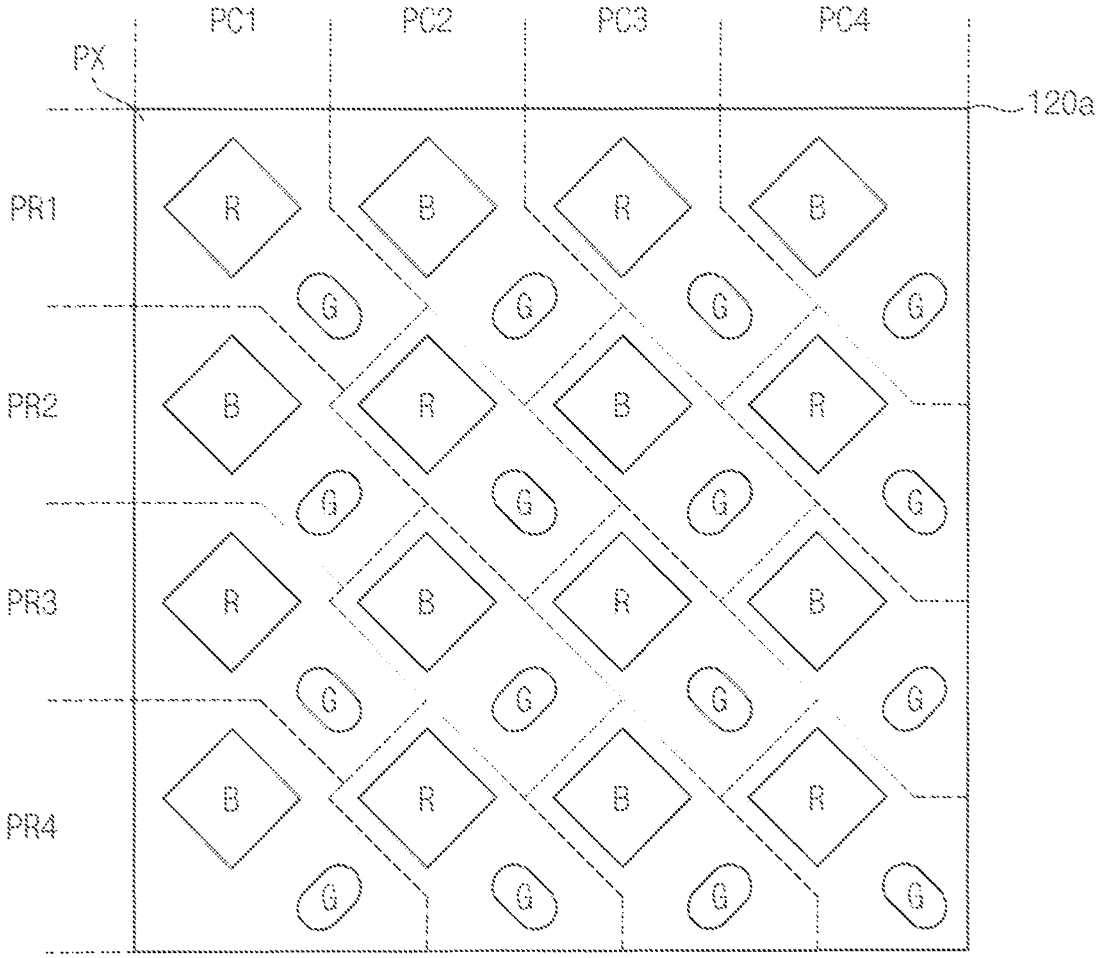
FIG. 2 is a diagram illustrating an example of a display panel having an RGBG pixel structure included in the display apparatus of FIG. 1.
Figure 3:
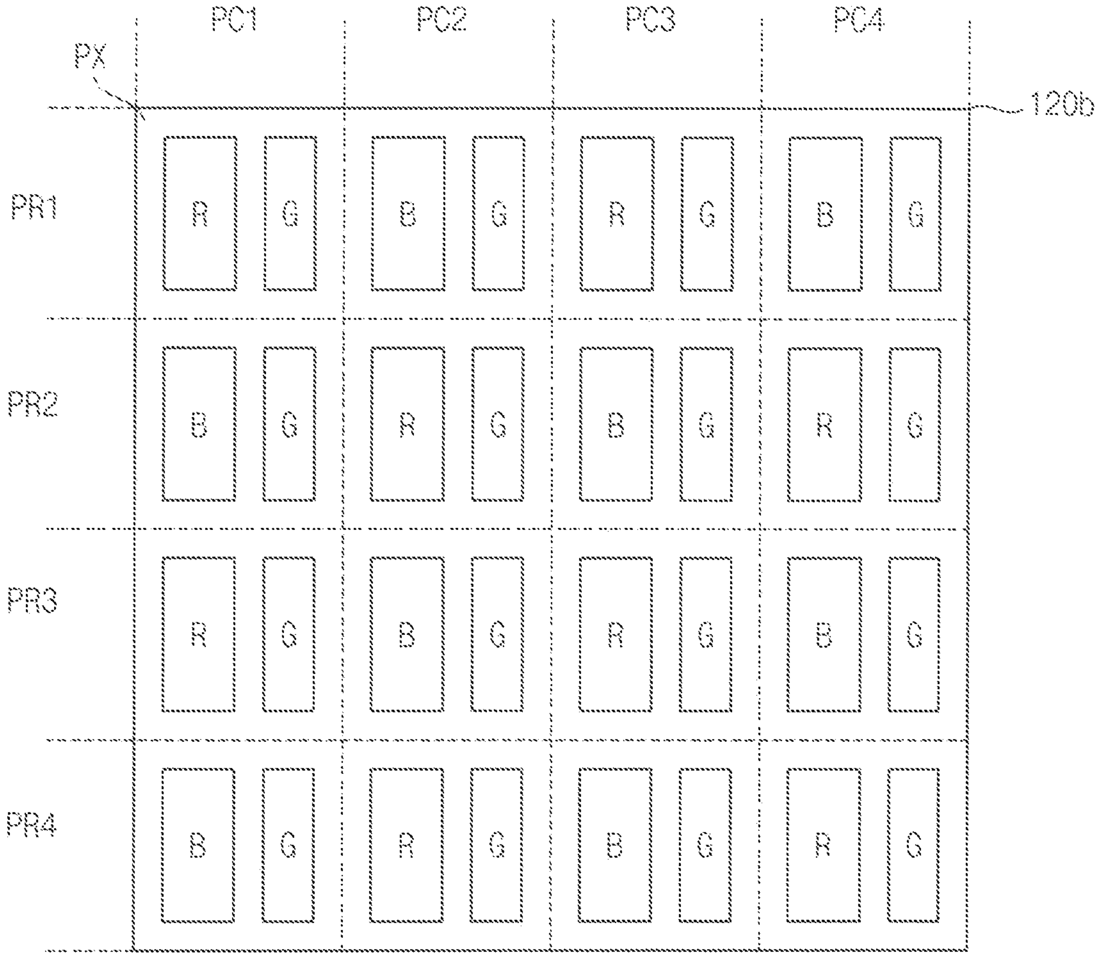
FIG. 3 is a diagram illustrating an example of a display panel having an RGBG pixel structure included in the display apparatus of FIG. 1.

FIG. 1 is a diagram illustrating a display apparatus 100 according to an embodiment of the present inventive concept. FIG. 2 is a diagram illustrating an example of a display panel 120*a* having an RGBG pixel structure included in the display apparatus 100 of FIG. 1. FIG. 3 is a diagram illustrating an example of a display panel 120*b* having an RGBG pixel structure included in the display apparatus 100 of FIG. 1.

Referring to FIG. 1, the display apparatus 100 includes a display driver 110 and a display panel 120. The display panel 120 may have a first pixel structure. For example, the first pixel structure may be an RGBG pixel structure. The display driver 110 may receive input image data including first data and drive the display panel 120 based on conversion data. For example, the first data may be RGB data.

The display panel 120 may be a Pentile™ RGBG display panel having an RGBG pixel structure. Each pixel of the display panel 120 may include two subpixels having different colors. For example, the pixel of the display panel 120 may include one R subpixel and one G subpixel. For example, the pixel of the display panel 120 may include one B subpixel and one G subpixel.

In an embodiment, the display panel 120 may be a diamond Pentile™ RGBG display panel 120*a* as shown in FIG. 2. In the diamond Pentile™ RGBG display panel 120*a*, one R subpixel, two G subpixels and one B subpixel adjacent to each other may be disposed at each vertex of a diamond shape. In addition, in a pixel PX of the diamond Pentile™ RGBG display panel 120*a*, one R subpixel and one G subpixel may be disposed in a diagonal direction. In the pixel PX of the diamond Pentile™ RGBG display panel 120*a*, one B subpixel and one G subpixel may be disposed in a diagonal direction. In addition, in odd-numbered pixel rows PR1 and PR3 of the diamond Pentile™ RGBG display panel 120*a*, the R subpixel, the G subpixel, the B subpixel and the G subpixel may be sequentially disposed. In even-numbered pixel rows PR2 and PR4 of the diamond Pentile™ RGBG display panel 120*a*, the B subpixel, the G subpixel, the R subpixel and the G subpixel may be sequentially disposed. In addition, in odd-numbered pixel columns PC1 and PC3 of the diamond Pentile™ RGBG display panel 120*a*, the R subpixel, the G subpixel, the B subpixel and the G subpixel may be sequentially disposed. In even-numbered pixel columns PC2 and PC4 of the diamond Pentile™ RGBG display panel 120*a*, the B subpixel, the G subpixel, the R subpixel and the G subpixel may be sequentially disposed. In addition, in the diamond Pentile™ RGBG display panel 120*a*, the G subpixel may be smaller than the R subpixel and the B subpixel. The R subpixel and the B subpixel may have a diamond shape. The G subpixel may have an elliptical shape. However, the sizes and the shapes of the R subpixel, G subpixel and the B subpixel may not be limited to the above description and may be variously modified.

In an embodiment, the display panel 120 may be a Pentile™ display panel 120*b* as shown in FIG. 3. In the Pentile™ display panel 120*b*, a pixel PX may include an R subpixel having a rectangular shape and a G subpixel having a rectangular shape smaller than the R subpixel. The pixel PX may include a B subpixel having a rectangular shape and the G subpixel having a rectangular shape smaller than the B subpixel. In addition, in odd-numbered pixel rows PR1 and PR3 of the Pentile™ display panel 120*b*, the R subpixel, the G subpixel, the B subpixel and the G subpixel may be sequentially disposed. In even-numbered pixel rows PR2 and PR4 of the Pentile™ display panel 120*b*, the B subpixel, the G subpixel, the R subpixel and the G subpixel may be sequentially disposed. In addition, in odd-numbered pixel columns PC1 and PC3 of the Pentile™ display panel 120*b*, the R subpixel and the G subpixel may be disposed in odd numbered rows and the B subpixel and the G subpixel may be disposed in even numbered rows. In even-numbered pixel columns PC2 and PC4 of the Pentile™ display panel 120*b*, the B subpixel and the G subpixel may be disposed in the odd numbered rows and the R subpixel and the G subpixel may be disposed in the even numbered rows.

The display driver 110 may receive input image data including the RGB data. The display driver 110 may operate RGB-RGBG data conversion to generate conversion data. For example, the conversion data may be RGBG data. The display driver 110 may generate a driving signal SDRV corresponding to the conversion data. The display driver 110 may provide the driving signal SDRV to the display panel 120 to drive the display panel 120. For example, the driving signal SRDV may include a scan signal and output data. The display driver 110 may include a converter 111. For example, the display driver 110 may include an RGB-RGBG converter 111 operating the RGB-RGBG data conversion for the RGB data to generate the conversion data. The display driver 110 may generate the output data based on the conversion data generated by the RGB-RGBG converter 111. The display driver 110 may apply the output data to the display panel 120.

The conventional display apparatus may operate data rearrangement (or data remapping) of the conversion data to generate the output data corresponding to the display panel 120 having the RGBG pixel structure. When the data rearrangement (or data remapping) of the conversion data is operated, a logic size for data operation may be increased so that a power consumption of the display apparatus may be increased and a data operation time of the display apparatus may be increased.

The display apparatus 100 according to the present embodiment generate the conversion data corresponding to the RGBG pixel structure of the display panel 120 so that valid output data corresponding to the display panel 100 may be generated without the data rearrangement (or the data remapping).

Figure 4:
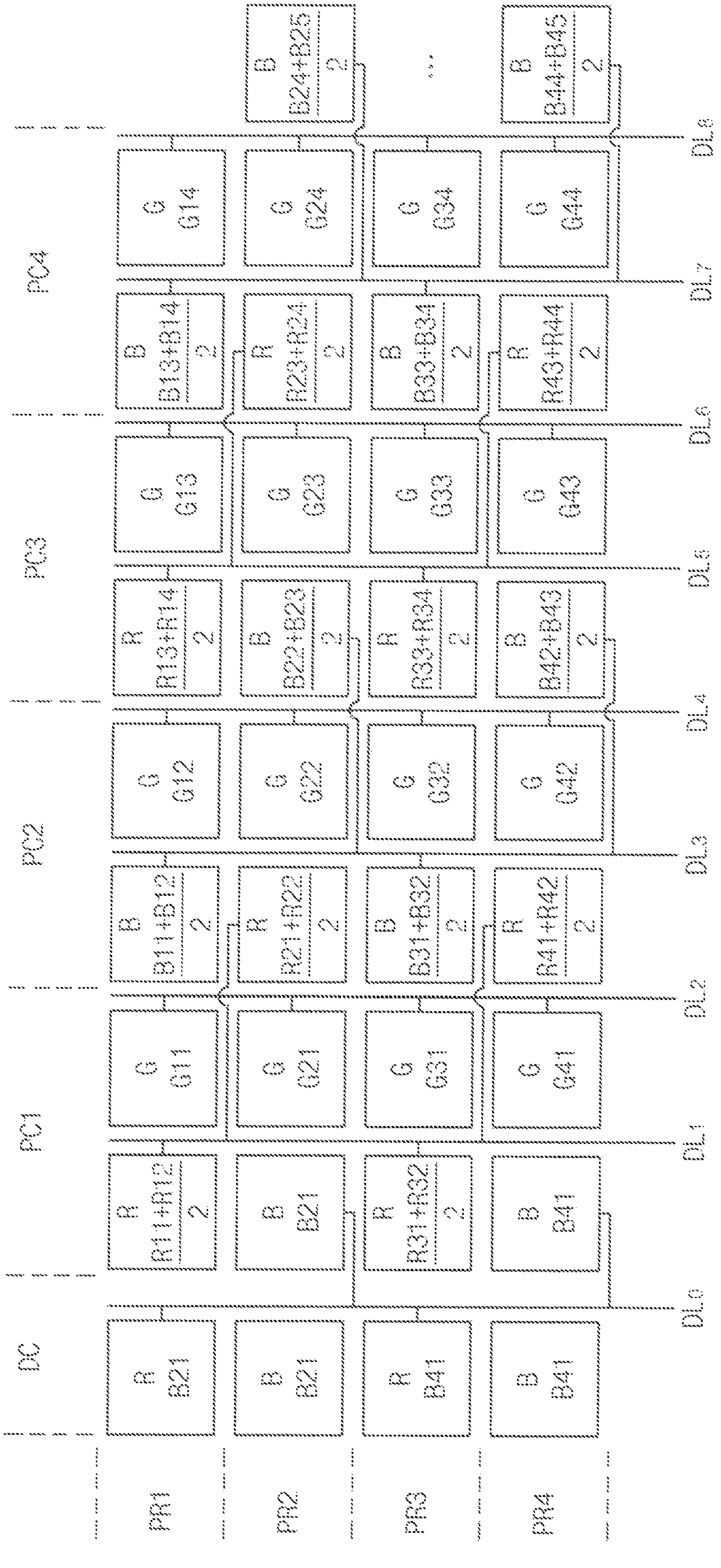
FIG. 4 is a diagram illustrating a connection structure between a subpixel of a display panel and a data line according to an embodiment of the present inventive concept.

FIG. 4 is a diagram illustrating a connection structure between a subpixel of the display panel 120 and a data line DL according to an embodiment of the present inventive concept. FIG. 5 is a diagram illustrating an example of input image data including RGB data according to the embodiment of FIG. 4. FIG. 6 is a diagram illustrating an example of conversion data generated from the input image data of FIG. 5. FIG. 7 is a diagram illustrating an example of output data generated from the conversion data of FIG. 6.

According to FIGS. 1 and 4 to 7, the display panel 120 may have the RGBG pixel structure. The display driver 110 may receive the input image data including the RGB data. The display driver 110 may drive the display panel 120 based on the conversion data. The conversion data may include conversion data in N rows and M columns. Herein, N is a positive integer and M is a positive integer. Each of (2K−1)-th column conversion data (odd-numbered column conversion data) may include first color conversion data and second color conversion data. Each of 2K-th column conversion data (even-numbered column conversion data) may include third color conversion data and fourth color conversion data. The second color conversion data and the fourth color conversion data may represent the same color. Herein, K is a positive integer. For example, the first color conversion data may represent red, the second color conversion data may represent green and the third color conversion data may represent blue.

The display panel 120 may be a Pentile™ RGBG display panel 120 having the RGBG pixel structure. The pixel of the display panel 100 may include two subpixels having different colors. For example, the pixel of the display panel 120 may include one R subpixel and one G subpixel. For example, the pixel of the display panel 120 may include one B subpixel and one G subpixel. For example, in odd-numbered pixel rows PR1 and PR3 of the display panel 120, the R subpixel, the G subpixel, the B subpixel and the G subpixel may be sequentially disposed. In even-numbered pixel rows PR2 and PR4 of the display panel 120, the B subpixel, the G subpixel, the R subpixel and the G subpixel may be sequentially disposed. In addition, the display panel 120 may include dummy pixels. For example, a R dummy pixel and a B dummy pixel may be sequentially disposed in a dummy pixel column DC of the display panel 120.

In an embodiment, as shown in FIG. 4, the display panel 120 may include a first row R dummy pixel, a second row B dummy pixel, a first row and first column R subpixel, a first row and first column G subpixel, a first row and second column B subpixel, a first row and second column G subpixel, a first row and third column R subpixel, a second row and first column B subpixel, a second row and first column G subpixel, a second row and second column R subpixel, a second row and second column G subpixel, and a second row and third column B subpixel. For example, the first row R dummy pixel may be disposed in a first pixel row PR1 and the dummy pixel column DC. The second row B dummy pixel may be disposed in a second pixel row PR2 and the dummy pixel column DC. The first row and first column R subpixel and the first row and first column G subpixel may be disposed in the first pixel row PR1 and a first pixel column PC1. The first row and second column B subpixel and the first row and second column G subpixel may be disposed in the first pixel row PR1 and a second pixel column PC2. The first row and third column R subpixel may be disposed in the first pixel row PR1 and a third pixel column PC3. The second row and first column B subpixel and the second row and first column G subpixel may be disposed in the second pixel row PR2 and the first pixel column PC1. The second row and second column R subpixel and the second row and second column G subpixel may be disposed in the second pixel row PR2 and the second pixel column PC2. The second row and third column B subpixel may be disposed in the second pixel row PR2 and the third pixel column PC3.

In an embodiment, as shown in FIG. 4, the display panel 120 may include a data line DL to which the output data are applied. The display panel 120 may include a dummy data line DL0 connected to the first row (PR1) R dummy pixel and the second row (PR2) and first column (PC1) B subpixel, a first data line DL1 connected to the first row (PR1) and first column (PC1) R subpixel and the second row (PR2) and second column (PC2) R subpixel, a second data line DL2 connected to the first row (PR1) and first column (PC1) G subpixel and the second row (PR2) and first column (PC1) G subpixel, a third data line DL3 connected to the first row (PR1) and second column (PC2) B subpixel and the second row (PR2) and third column (PC3) B subpixel, and a fourth data line DL4 connected to the first row (PR1) and second column (PC2) G subpixel and the second row (PR2) and second column (PC2) G subpixel.

The display driver 110 may receive the input image data including the RGB data. For example, the input image data include red data, green data and blue data. However, the input image data of the present inventive concept may not be limited to the red data, the green data and the blue data. For example, the input image data may further include white data. For example, the input image data may include magenta data, yellow data and cyan data.

In an embodiment, as shown in FIG. 5, the input image data may include a first row dummy red data R10, a first row dummy green data G10, a first row dummy blue data B10, a first row and first column red data R11, a first row and first column green data G11, a first row and first column blue data B11, a first row and second column red data R12, a first row and second column green data G12, a first row and second column blue data B12, a first row and third column red data R13, a first row and third column green data G13, a first row and third column blue data B13, a first row and fourth column red data R14, a first row and fourth column green data G14 and a first row and fourth column blue data B14. In addition, the input image data may include a second row dummy red data R20, a second row dummy green data G20, a second row dummy blue data B20, a second row and first column red data R21, a second row and first column green data G21, a second row and first column blue data B21, a second row and second column red data R22, a second row and second column green data G22, a second row and second column blue data B22, a second row and third column red data R23, a second row and third column green data G23, a second row and third column blue data B23, a second row and fourth column red data R24, a second row and fourth column green data G24 and a second row and fourth column blue data B24.

Herein, the first row dummy red data R10 may be the same as the first row and first column red data R11, the first row dummy green data G10 may be the same as the first row and first column green data G11 and the first row dummy blue data B10 may be the same as the first row and first column blue data B11. In addition, the second row dummy red data R20 may be the same as the second row and first column red data R21, the second row dummy green data G20 may be the same as the second row and first column green data G21 and the second row dummy blue data B20 may be the same as the second row and first column blue data B21.

The display driver 110 may operate the RGB-RGBG conversion for the RGB data included in the input image data to generate the conversion data. For example, the conversion data may be RGBG data. The display driver 110 may include an RGB-RGBG converter 111 operating the RGB-RGBG data conversion for the RGB data to generate the conversion data. As shown in FIG. 6, the RGB-RGBG converter 111 may generate the conversion data corresponding to the RGBG pixel structure of the display panel 120 by combining the RGB data of adjacent columns.

For example, the conversion data may include first row dummy red conversion data generated based on the first row dummy red data R11 and the first row and first column red data R11, and first row dummy green conversion data corresponding to the first row dummy green data G11. The conversion data may include first row and first column red conversion data generated based on the first row and first column red data R11 and the first row and second column red data R12, and first row and first column green conversion data corresponding to the first row and first column green data G11. The conversion data may include first row and second column blue conversion data generated based on the first row and first column blue data B11 and the first row and second column blue data B12, and first row and second column green conversion data corresponding to the first row and second column green data G12. The conversion data may include first row and third column red conversion data generated based on the first row and third column red data R13 and the first row and fourth column red data R14, and first row and third column green conversion data corresponding to the first row and third column green data G13.

For example, the first row dummy red conversion data may correspond to an average value of the first row dummy red data R11 and the first row and first column red data R11 which is R11. The first row and first column red conversion data may correspond to an average value of the first row and first column red data R11 and the first row and second column red data R12 which is (R11+R12)/2. The first row and second column blue conversion data may correspond to an average value of the first row and first column blue data B11 and the first row and second column blue data B12 which is (B11+B12)/2. The first row and third column red conversion data may correspond to an average value of the first row and third column red data R13 and the first row and fourth column red data R14 which is (R13+R14)/2.

For example, the conversion data may include second row dummy blue conversion data generated based on the second row dummy blue data B21 and the second row and first column blue data B21, and second row dummy green conversion data corresponding to the second row dummy green data G21. The conversion data may include second row and first column red conversion data generated based on the second row and first column red data R21 and the second row and second column red data R22, and second row and first column green conversion data corresponding to the second row and first column green data G21. The conversion data may include second row and second column blue conversion data generated based on the second row and second column blue data B22 and the second row and third column blue data B23, and second row and second column green conversion data corresponding to the second row and second column green data G22. The conversion data may include second row and third column red conversion data generated based on the second row and third column red data R23 and the second row and fourth column red data R24, and second row and third column green conversion data corresponding to the second row and third column green data G23.

For example, the second row dummy blue conversion data may correspond to an average value of the second row dummy blue data B21 and the second row and first column blue data B21 which is B21. The second row and first column red conversion data may correspond to an average value of the second row and first column red data R21 and the second row and second column red data R22 which is (R21+R22)/2. The second row and second column blue conversion data may correspond to an average value of the second row and second column blue data B22 and the second row and third column blue data B23 which is (B22+B23)/2. The second row and third column red conversion data may correspond to an average value of the second row and third column red data R23 and the second row and fourth column red data R24 which is (R23+R24)/2.

The display driver 110 may generate the output data based on the conversion data. For example, as shown in FIG. 7, the display driver 110 may generate the output data corresponding to the conversion data generated by the RGB-RGBG converter 111. The display driver 110 may apply the output data to the display panel 120. For example, the display driver 110 may output the output data to the subpixels of the display panel 120 through the data line DL.

For example, output data corresponding to the first row and first column red conversion data (R11+R12)/2 may be applied to the first row and first column R subpixel. Output data corresponding to the first row and first column green conversion data G11 may be applied to the first row and first column G subpixel. Output data corresponding to the first row and second column blue conversion data (B11+B12)/2 may be applied to the first row and second column B subpixel. Output data corresponding to the first row and second column green conversion data G12 may be applied to the first row and second column G subpixel. Output data corresponding to the first row and third column red conversion data (R13+R14)/2 may be applied to the first row and third column R subpixel.

For example, output data corresponding to the second row dummy blue conversion data B21 may be applied to the second row and first column B subpixel. Output data corresponding to the second row and first column green conversion data G21 may be applied to the second row and first column G subpixel. Output data corresponding to the second row and second column red conversion data (R21+R22)/2 may be applied to the second row and second column R subpixel. Output data corresponding to the second row and second column green conversion data G22 may be applied to the second row and second column G subpixel. Output data corresponding to the second row and second column blue conversion data (B22+B23)/2 may be applied to the second row and third column B subpixel.

As explained above, the display apparatus 100 may generate the output data corresponding to the display panel 120 by generating the conversion data corresponding to the RGBG pixel structure without data rearrangement (or data remapping) of the conversion data. Thus, a logic size for data operation may be reduced in the display apparatus 100 so that a power consumption of the display apparatus 100 may be reduced and a data operation time of the display apparatus 100 may be decreased. Therefore, a display quality of the display panel 120 may be enhanced.

Figure 8:
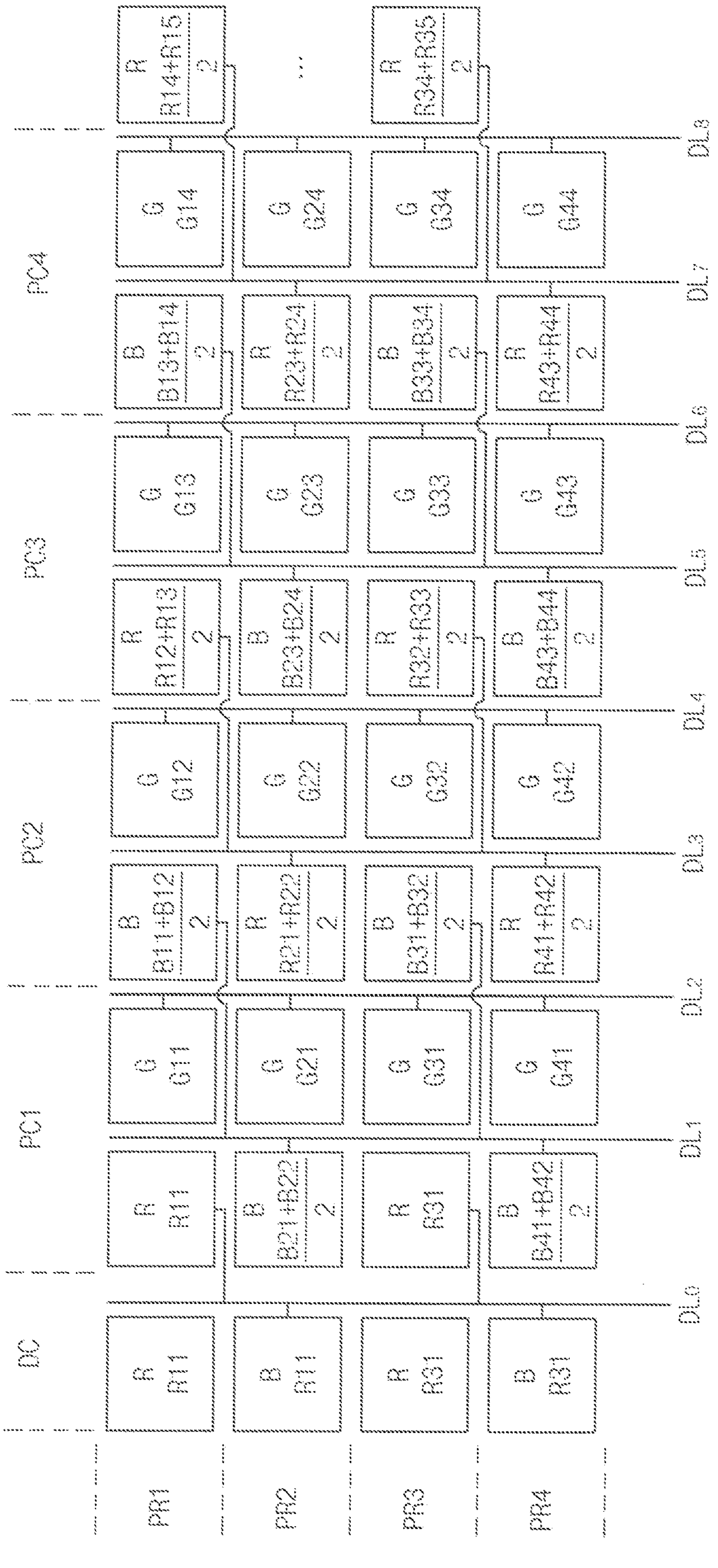
FIG. 8 is a diagram illustrating a connection structure between a subpixel of a display panel and a data line according to an embodiment of the present inventive concept.
Figure 9:
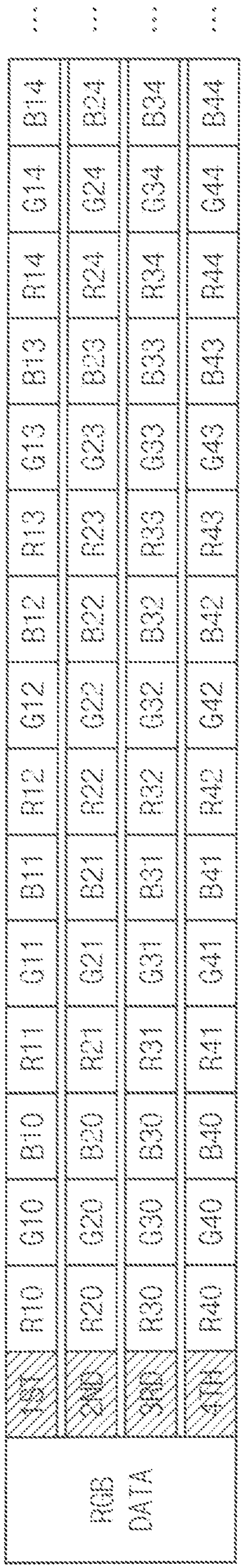
FIG. 9 is a diagram illustrating an example of input image data including RGB data according to the embodiment of FIG. 8.

FIG. 8 is a diagram illustrating a connection structure between a subpixel of a display panel 120 and a data line DL according to an embodiment of the present inventive concept. FIG. 9 is a diagram illustrating an example of input image data including RGB data according to the embodiment of FIG. 8. FIG. 10 is a diagram illustrating an example of conversion data generated from the input image data of FIG. 9. FIG. 11 is a diagram illustrating an example of output data generated from the conversion data of FIG. 10.

Referring to FIGS. 1 and 8 to 11, the display panel 120 may have the RGBG pixel structure. The display driver 110 may receive the input image data including the RGB data. The display driver 110 may drive the display panel 120 based on the conversion data. The conversion data may include conversion data in N rows and M columns. Herein, N is a positive integer and M is a positive integer. Each of (2K−1)-th column conversion data may include first color conversion data and second color conversion data. Each of 2K-th column conversion data may include third color conversion data and fourth color conversion data. The second conversion data and the fourth conversion data may represent the same color. Herein, K is a positive integer. For example, the first color conversion data may represent blue, the second color conversion data and the fourth color conversion data may represent green and the third color conversion data may represent red.

The display panel 120 may be a Pentile™ RGBG display panel 120 having the RGBG pixel structure. The pixel of the display panel 100 may include two subpixels having different colors. For example, the pixel of the display panel 120 may include one R subpixel and one G subpixel. For example, the pixel of the display panel 120 may include one B subpixel and one G subpixel. For example, in odd-numbered pixel rows PR1 and PR3 of the display panel 120, the R subpixel, the G subpixel, the B subpixel and the G subpixel may be sequentially disposed. In even-numbered pixel rows PR2 and PR4 of the display panel 120, the B subpixel, the G subpixel, the R subpixel and the G subpixel may be sequentially disposed. In addition, the display panel 120 may include dummy pixels. For example, a R dummy pixel and a B dummy pixel may be sequentially disposed in a dummy pixel column DC of the display panel 120.

In an embodiment, as shown in FIG. 8, the display panel 120 may include a first row R dummy pixel, a second row B dummy pixel, a first row and first column R subpixel, a first row and first column G subpixel, a first row and second column B subpixel, a first row and second column G subpixel, a first row and third column R subpixel, a second row and first column B subpixel, a second row and first column G subpixel, a second row and second column R subpixel, a second row and second column G subpixel, and a second row and third column B subpixel. For example, the first row R dummy pixel may be disposed in a first pixel row PR1 and the dummy pixel column DC. The second row B dummy pixel may be disposed in a second pixel row PR2 and the dummy pixel column DC. The first row and first column R subpixel and the first row and first column G subpixel may be disposed in the first pixel row PR1 and a first pixel column PC1. The first row and second column B subpixel and the first row and second column G subpixel may be disposed in the first pixel row PR1 and a second pixel column PC2. The first row and third column R subpixel may be disposed in the first pixel row PR1 and a third pixel column PC3. The second row and first column B subpixel and the second row and first column G subpixel may be disposed in the second pixel row PR2 and the first pixel column PC1. The second row and second column R subpixel and the second row and second column G subpixel may be disposed in the second pixel row PR2 and the second pixel column PC2. The second row and third column B subpixel may be disposed in the second pixel row PR2 and the third pixel column PC3.

In an embodiment, as shown in FIG. 8, the display panel 120 may include a data line DL to which the output data are applied. The display panel 120 may include a dummy data line DL0 connected to the first row and first column R subpixel and the second row B dummy pixel, a first data line DL1 connected to the first row and second column B subpixel and the second row and first column B subpixel, a second data line DL2 connected to the first row and first column G subpixel and the second row and first column G subpixel, a third data line DL3 connected to the first row and third column R subpixel and the second row and second column R subpixel and a fourth data line DL4 connected to the first row and second column G subpixel and the second row and second column G subpixel.

The display driver 110 may receive the input image data including the RGB data. For example, the input image data include red data, green data and blue data. However, the input image data of the present inventive concept may not be limited to the red data, the green data and the blue data. For example, the input image data may further include white data. For example, the input image data may include magenta data, yellow data and cyan data.

In an embodiment, as shown in FIG. 9, the input image data may include a first row dummy red data R10, a first row dummy green data G10, a first row dummy blue data B10, a first row and first column red data R11, a first row and first column green data G11, a first row and first column blue data B11, a first row and second column red data R12, a first row and second column green data G12, a first row and second column blue data B12, a first row and third column red data R13, a first row and third column green data G13, a first row and third column blue data B13, a first row and fourth column red data R14, a first row and fourth column green data G14 and a first row and fourth column blue data B14. In addition, the input image data may include a second row dummy red data R20, a second row dummy green data G20, a second row dummy blue data B20, a second row and first column red data R21, a second row and first column green data G21, a second row and first column blue data B21, a second row and second column red data R22, a second row and second column green data G22, a second row and second column blue data B22, a second row and third column red data R23, a second row and third column green data G23, a second row and third column blue data B23, a second row and fourth column red data R24, a second row and fourth column green data G24 and a second row and fourth column blue data B24.

Herein, the first row dummy red data R10 may be the same as the first row and first column red data R11, the first row dummy green data G10 may be the same as the first row and first column green data G11 and the first row dummy blue data B10 may be the same as the first row and first column blue data B11. In addition, the second row dummy red data R20 may be the same as the second row and first column red data R21, the second row dummy green data G20 may be the same as the second row and first column green data G21 and the second row dummy blue data B20 may be the same as the second row and first column blue data B21.

The display driver 110 may operate the RGB-RGBG conversion for the RGB data included in the input image data to generate the conversion data. For example, the conversion data may be RGBG data. The display driver 110 may include an RGB-RGBG converter 111 operating the RGB-RGBG data conversion for the RGB data to generate the conversion data. As shown in FIG. 10, the RGB-RGBG converter 111 may generate the conversion data corresponding to the RGBG pixel structure of the display panel 120 by combining the RGB data of adjacent columns.

For example, the conversion data may include first row dummy red conversion data generated based on the first row dummy red data R11 and the first row and first column red data R11, and first row dummy green conversion data corresponding to the first row dummy green data G11. The conversion data may include first row and first column blue conversion data generated based on the first row and first column blue data B11 and the first row and second column blue data B12, and first row and first column green conversion data corresponding to the first row and first column green data G11. The conversion data may include first row and second column red conversion data generated based on the first row and second column red data R12 and the first row and third column red data R13, and first row and second column green conversion data corresponding to the first row and second column green data G12. The conversion data may include first row and third column blue conversion data generated based on the first row and third column blue data B13 and the first row and fourth column blue data B14, and first row and third column green conversion data corresponding to the first row and third column green data G13.

For example, the first row dummy red conversion data may correspond to an average value of the first row dummy red data R11 and the first row and first column red data R11 which is R11. The first row and first column blue conversion data may correspond to an average value of the first row and first column blue data B11 and the first row and second column blue data B12 which is (B11+B12)/2. The first row and second column red conversion data may correspond to an average value of the first row and second column red data R12 and the first row and third column red data R13 which is (R12+R13)/2. The first row and third column blue conversion data may correspond to an average value of the first row and third column blue data B13 and the first row and fourth column blue data B14 which is (B13+B14)/2.

For example, the conversion data may include second row dummy blue conversion data generated based on the second row dummy blue data B21 and the second row and first column blue data B21, and second row dummy green conversion data corresponding to the second row dummy green data G21. The conversion data may include second row and first column blue conversion data generated based on the second row and first column blue data B21 and the second row and second column blue data B22, and second row and first column green conversion data corresponding to the second row and first column green data G21. The conversion data may include second row and second column red conversion data generated based on the second row and first column red data R21 and the second row and second column red data R22, and second row and second column green conversion data corresponding to the second row and second column green data G22. The conversion data may include second row and third column blue conversion data generated based on the second row and third column blue data B23 and the second row and fourth column blue data B24, and second row and third column green conversion data corresponding to the second row and third column green data G23.

For example, the second row dummy blue conversion data may correspond to an average value of the second row dummy blue data B21 and the second row and first column blue data B21 which is B21. The second row and first column blue conversion data may correspond to an average value of the second row and first column blue data B21 and the second row and second column blue data B22 which is (B21+B22)/2. The second row and second column red conversion data may correspond to an average value of the second row and first column red data R21 and the second row and second column red data R22 which is (R21+R22)/2. The second row and third column blue conversion data may correspond to an average value of the second row and third column blue data B23 and the second row and fourth column blue data B24 which is (B23+B24)/2.

The display driver 110 may generate the output data based on the conversion data. For example, as shown in FIG. 11, the display driver 110 may generate the output data corresponding to the conversion data generated by the RGB-RGBG converter 111. The display driver 110 may apply the output data to the display panel 120. For example, the display driver 110 may output the output data to the subpixels of the display panel 120 through the data line DL.

For example, output data corresponding to the first row dummy red conversion data R11 may be applied to the first row and first column R subpixel. Output data corresponding to the first row and first column green conversion data G11 may be applied to the first row and first column G subpixel. Output data corresponding to the first row and first column blue conversion data (B11+B12)/2 may be applied to the first row and second column B subpixel. Output data corresponding to the first row and second column green conversion data G12 may be applied to the first row and second column G subpixel. Output data corresponding to the first row and second column red conversion data (R12+R13)/2 may be applied to the first row and third column R subpixel.

For example, output data corresponding to the second row and first column blue conversion data (B21+B22)/2 may be applied to the second row and first column B subpixel. Output data corresponding to the second row and first column green conversion data G21 may be applied to the second row and first column G subpixel. Output data corresponding to the second row and second column red conversion data (R21+R22)/2 may be applied to the second row and second column R subpixel. Output data corresponding to the second row and second column green conversion data G22 may be applied to the second row and second column G subpixel. Output data corresponding to the second row and third column blue conversion data (B23+B24)/2 may be applied to the second row and third column B subpixel.

As explained above, the display apparatus 100 may generate the output data corresponding to the display panel 120 by generating the conversion data corresponding to the RGBG pixel structure without data rearrangement (or data remapping) of the conversion data. Thus, a logic size for data operation may be reduced in the display apparatus 100 so that a power consumption of the display apparatus 100 may be reduced and a data operation time of the display apparatus 100 may be decreased. Therefore, a display quality of the display panel 120 may be enhanced.

Figure 12:
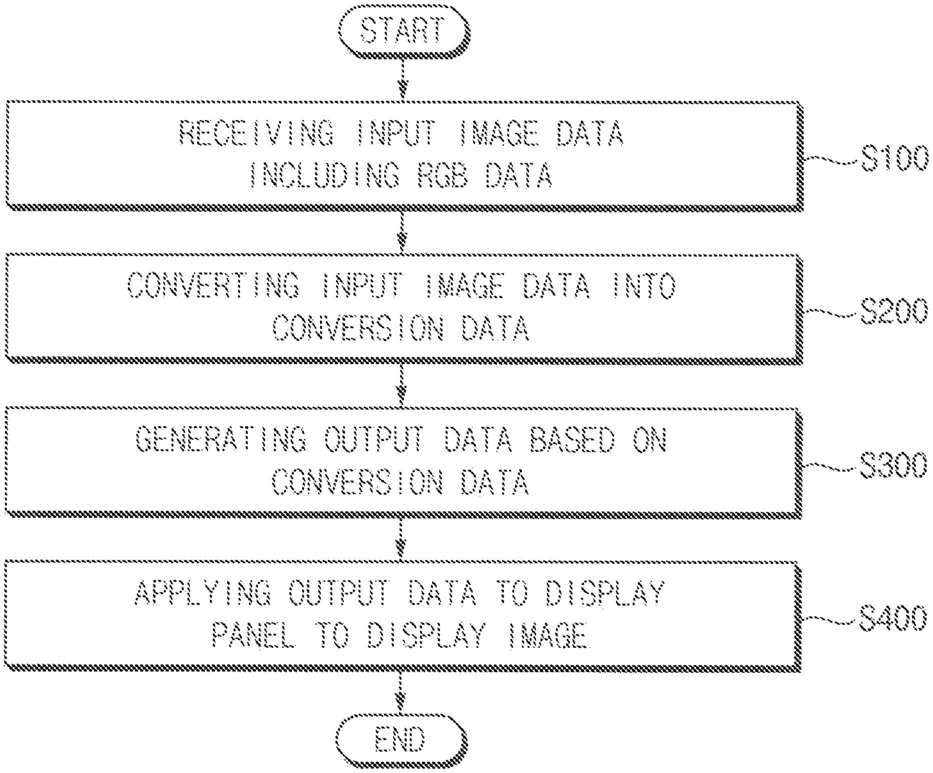
FIG. 12 is a flowchart diagram illustrating a method of driving a display apparatus according to an embodiment of the present inventive concept.

FIG. 12 is a flowchart diagram illustrating a method of driving a display apparatus 100 according to an embodiment of the present inventive concept.

Referring to FIG. 12, the display apparatus 100 may receive the input image data (S100), convert the RGB data into the conversion data (S200), generate the output data based on the conversion data (S300) and apply the output data to the display panel 120 to display the image (S400).

As explained referring to FIGS. 1 to 4, the display panel 120 may be the Pentile™ RGBG display panel 120 having the RGBG pixel structure. The pixel of the display panel 120 may include two subpixels having different colors. For example, the pixel of the display panel 120 may include one R subpixel and one G subpixel. For example, the pixel of the display panel 120 may include one B subpixel and one G subpixel.

In an embodiment, the display apparatus 100 may receive the input image data including the RGB data (S100). For example, the display driver 110 may receive the input image data including the RGB data. The input image data may include red data, green data and blue data. For example, the input image data may include a first row dummy red data R10, a first row dummy green data G10, a first row dummy blue data B10, a first row and first column red data R11, a first row and first column green data G11, a first row and first column blue data B11, a first row and second column red data R12, a first row and second column green data G12, a first row and second column blue data B12, a first row and third column red data R13, a first row and third column green data G13, a first row and third column blue data B13, a first row and fourth column red data R14, a first row and fourth column green data G14 and a first row and fourth column blue data B14. In addition, the input image data may include a second row dummy red data R20, a second row dummy green data G20, a second row dummy blue data B20, a second row and first column red data R21, a second row and first column green data G21, a second row and first column blue data B21, a second row and second column red data R22, a second row and second column green data G22, a second row and second column blue data B22, a second row and third column red data R23, a second row and third column green data G23, a second row and third column blue data B23, a second row and fourth column red data R24, a second row and fourth column green data G24 and a second row and fourth column blue data B24.

In an embodiment, the display apparatus 100 may convert the RGB data into the conversion data (S200). For example, the display driver 110 may operate the RGB-RGBG data conversion for the RGB data included in the input image data to generate the conversion data. For example, the conversion data may be the RGBG data. The display driver 110 may include the RGB-RGBG converter 111 operating the RGB-RGBG data conversion for the RGB data to generate the conversion data. The RGB-RGBG converter 111 may generate the conversion data corresponding to the RGBG pixel structure of the display panel 120 by combining the RGB data of adjacent columns.

For example, the conversion data may include first row dummy red conversion data generated based on the first row dummy red data R11 and the first row and first column red data R11, and first row dummy green conversion data corresponding to the first row dummy green data G11. The conversion data may include first row and first column red conversion data generated based on the first row and first column red data R11 and the first row and second column red data R12, and first row and first column green conversion data corresponding to the first row and first column green data G11. The conversion data may include first row and second column blue conversion data generated based on the first row and first column blue data B11 and the first row and second column blue data B12, and first row and second column green conversion data corresponding to the first row and second column green data G12. The conversion data may include first row and third column red conversion data generated based on the first row and third column red data R13 and the first row and fourth column red data R14, and first row and third column green conversion data corresponding to the first row and third column green data G13. For example, the conversion data may include second row dummy blue conversion data generated based on the second row dummy blue data B21 and the second row and first column blue data B21, and second row dummy green conversion data corresponding to the second row dummy green data G21. The conversion data may include second row and first column red conversion data generated based on the second row and first column red data R21 and the second row and second column red data R22, and second row and first column green conversion data corresponding to the second row and first column green data G21. The conversion data may include second row and second column blue conversion data generated based on the second row and second column blue data B22 and the second row and third column blue data B23, and second row and second column green conversion data corresponding to the second row and second column green data G22. The conversion data may include second row and third column red conversion data generated based on the second row and third column red data R23 and the second row and fourth column red data R24, and second row and third column green conversion data corresponding to the second row and third column green data G23.

In an embodiment, the display apparatus 100 may generate the output data based on the conversion data (S300), and apply the output data to the display panel 120 to display the image (S400). For example, the display driver 110 may generate the output data based on the conversion data. The display driver 110 may generate the output data corresponding to the conversion data generated by the RGB-RGBG converter 111. The display driver 110 may apply the output data to the display panel 120. The display driver 110 may output the output data to the subpixels of the display panel 120 through the data line DL. The output data are applied to the subpixels so that the display panel 120 may display the image corresponding to the input image data.

For example, output data corresponding to the first row and first column red conversion data (R11+R12)/2 may be applied to the first row and first column R subpixel. Output data corresponding to the first row and first column green conversion data G11 may be applied to the first row and first column G subpixel. Output data corresponding to the first row and second column blue conversion data (B11+B12)/2 may be applied to the first row and second column B subpixel. Output data corresponding to the first row and second column green conversion data G12 may be applied to the first row and second column G subpixel. Output data corresponding to the first row and third column red conversion data (R13+R14)/2 may be applied to the first row and third column R subpixel. Output data corresponding to the second row dummy blue conversion data B21 may be applied to the second row and first column B subpixel. Output data corresponding to the second row and first column green conversion data G21 may be applied to the second row and first column G subpixel. Output data corresponding to the second row and second column red conversion data (R21+R22)/2 may be applied to the second row and second column R subpixel. Output data corresponding to the second row and second column green conversion data G22 may be applied to the second row and second column G subpixel. Output data corresponding to the second row and second column blue conversion data (B22+B23)/2 may be applied to the second row and third column B subpixel.

As explained above, the display apparatus 100 may generate the output data corresponding to the display panel 120 by generating the conversion data corresponding to the RGBG pixel structure without data rearrangement (or data remapping) of the conversion data. Thus, a logic size for data operation may be reduced in the display apparatus 100 so that a power consumption of the display apparatus 100 may be reduced and a data operation time of the display apparatus 100 may be decreased. Therefore, a display quality of the display panel 120 may be enhanced.

Figure 13:
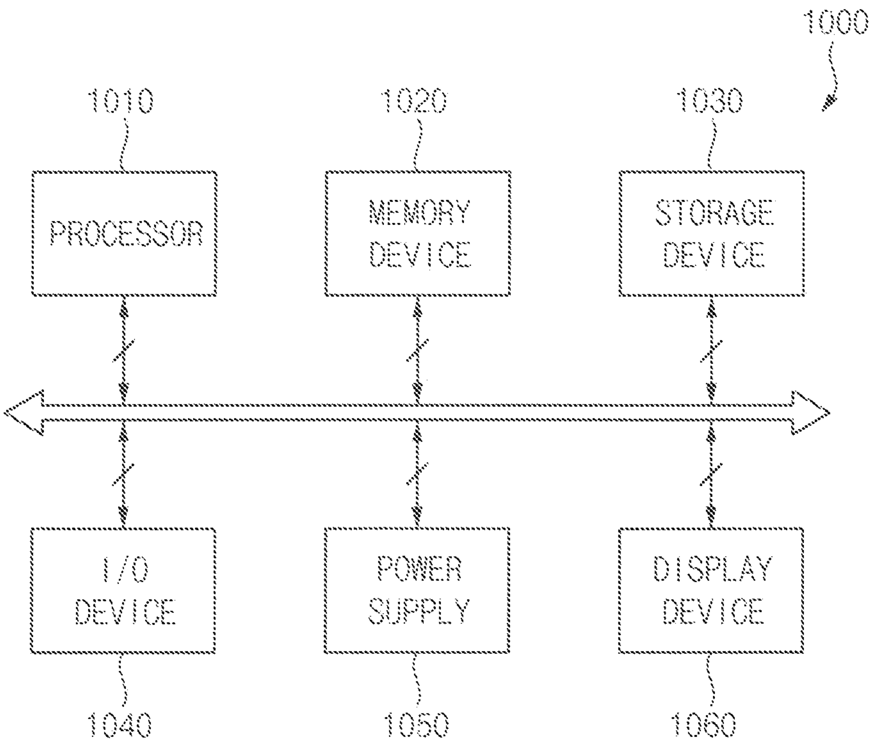
FIG. 13 is a block diagram illustrating an electronic device according to an embodiment of the present inventive concept.
Figure 14:
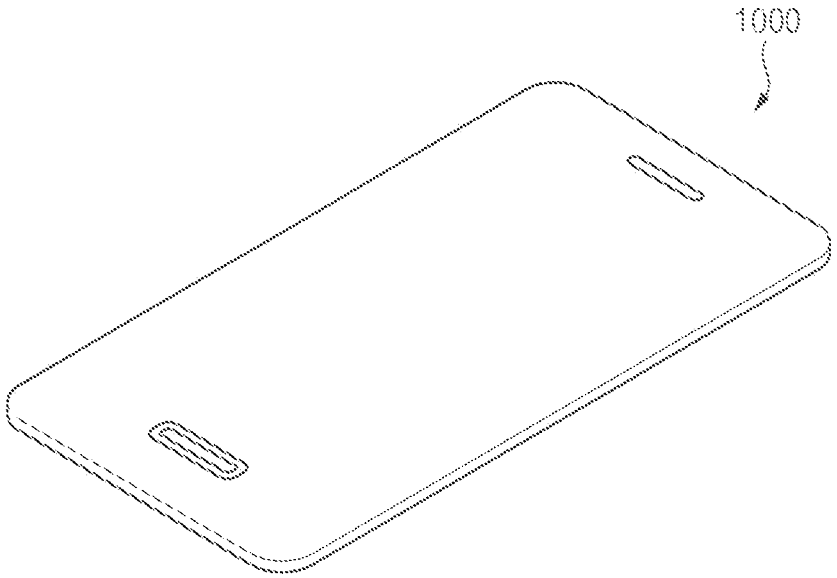
FIG. 14 is a diagram illustrating an example in which the electronic device of FIG. 13 is implemented as a smartphone.

FIG. 13 is a block diagram illustrating an electronic device 1000 according to an embodiment of the present inventive concept. FIG. 14 is a diagram illustrating an example in which the electronic device 1000 of FIG. 13 is implemented as a smartphone.

Referring to FIGS. 13 and 14, the electronic device 1000 may include a processor 1010, a memory device 1020, a storage device 1030, an input/output (I/O) device 1040, a power supply 1050, and a display apparatus 1060. Herein, the display apparatus 1060 may be the display apparatus 100 of FIG. 1. In addition, the electronic device 1000 may further include a plurality of ports for communicating with a video card, a sound card, a memory card, a universal serial bus (USB) device, other electronic device, and the like. In an embodiment, as illustrated in FIG. 14, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be connected to other components via an address bus, a control bus, a data bus, and the like. Further, the processor 1010 may be connected to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display apparatus 1060. The power supply 1050 may provide power for operations of the electronic device 1000. The display apparatus may be connected to other components through buses or other communication links.

The display apparatus 1060 may display an image corresponding to visual information of the electronic device 1000. Herein, the display apparatus 1060 may include the display panel having the RGBG pixel structure and the display driver may receive the input image data including the RGB data and generating the driving signal for driving the display panel based on the conversion data. The display driver may include the RGB-RGBG converter operating the RGB-RGBG data conversion for the RGB data to generate the conversion data. The conversion data may include conversion data in N rows and M columns. Each of (2K−1)-th column conversion data may include red conversion data and green conversion data. Each of 2K-th column conversion data may include blue conversion data and the green conversion data. Herein, N, M and K are a positive integer. The display apparatus according to the present inventive concept may generate the output data corresponding to the display panel by generating the conversion data corresponding to the RGBG pixel structure without data rearrangement (or data remapping) of the conversion data. Thus, a logic size for data operation may be reduced in the display apparatus so that a power consumption of the display apparatus may be reduced and a data operation time of the display apparatus may be decreased. Therefore, a display quality of the display panel may be enhanced. However, since these are described above, duplicated description related thereto will not be repeated.

The present inventive concept may be applied to any display apparatus and an electronic device including the same. For example, the present inventive concept may be applied to a digital TV, a 3D TV, a personal computer (PC), a home electronic device, a notebook computer, a tablet computer, a mobile phone, a smart phone, a PDA, a PMP, a digital camera, a music player, a portable game console, a navigation, etc.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:

a display panel having a first pixel structure; and a display driver configured to receive input image data including first data, and generate a driving signal for driving the display panel based on conversion data, wherein the display driver includes a converter configured to convert the first data into the conversion data, wherein the conversion data include conversion data in N rows and M columns, wherein each of (2K−1)-th column conversion data include first color conversion data representing a red color and second color conversion data representing a green color, wherein each of 2K-th column conversion data include third color conversion data representing a blue color and fourth color conversion data representing the green color, wherein N, M and K are positive integers, wherein the input image data include second row dummy blue data and a second row and first column blue data, and wherein the conversion data include second row dummy blue conversion data generated based on the second row dummy blue data and the second row and first column blue data.

2. The display apparatus of claim 1, wherein the first pixel structure is an RGBG pixel structure, wherein the first data are RGB data, and wherein the converter is an RGB-RGBG converter.

3. The display apparatus of claim 1, wherein the input image data further include second row dummy red data, second row dummy green data, a second row and first column red data, a second row and first column green data, a second row and second column red data, a second row and second column green data, a second row and second column blue data, a second row and third column red data, a second row and third column green data, and a second row and third column blue data, and wherein the conversion data further include second row dummy green conversion data corresponding to the second row dummy green data, second row and first column red conversion data generated based on the second row and first column red data and the second row and second column red data, and second row and first column green conversion data corresponding to the second row and first column green data, second row and second column blue conversion data generated based on the second row and second column blue data and the second row and third column blue data, and second row and second column green conversion data corresponding to the second row and second column green data.

4. The display apparatus of claim 3, wherein the second row dummy blue conversion data correspond to an average value of the second row dummy blue data and the second row and first column blue data, wherein the second row and first column red conversion data correspond to an average value of the second row and first column red data and the second row and second column red data, and wherein the second row and second column blue conversion data correspond to an average value of the second row and second column blue data and the second row and third column blue data.

5. The display apparatus of claim 3, wherein the input image data further include a first row dummy red data, a first row dummy green data, a first row dummy blue data, a first row and first column red data, a first row and first column green data, a first row and first column blue data, a first row and second column red data, a first row and second column green data, a first row and second column blue data, a first row and third column red data, a first row and third column green data, a first row and third column blue data, a first row and fourth column red data, a first row and fourth column green data and a first row and fourth column blue data, and wherein the conversion data further include first row dummy red conversion data generated based on the first row dummy red data and the first row and first column red data and first row dummy green conversion data corresponding to the first row dummy green data, first row and first column red conversion data generated based on the first row and first column red data and the first row and second column red data and first row and first column green conversion data corresponding to the first row and first column green data, first row and second column blue conversion data generated based on the first row and first column blue data and the first row and second column blue data and first row and second column green conversion data corresponding to the first row and second column green data, and first row and third column red conversion data generated based on the first row and third column red data and the first row and fourth column red data.

6. The display apparatus of claim 5, wherein the first row dummy red conversion data correspond to an average value of the first row dummy red data and the first row and first column red data, wherein the first row and first column red conversion data correspond to an average value of the first row and first column red data and the first row and second column red data, wherein the first row and second column blue conversion data correspond to an average value of the first row and first column blue data and the first row and second column blue data, and wherein the first row and third column red conversion data correspond to an average value of the first row and third column red data and the first row and fourth column red data.

7. The display apparatus of claim 5, wherein the display panel includes a first row R dummy pixel, a second row B dummy pixel, a first row and first column R subpixel, a first row and first column G subpixel, a first row and second column B subpixel, a first row and second column G subpixel, a first row and third column R subpixel, a second row and first column B subpixel, a second row and first column G subpixel, a second row and second column R subpixel, a second row and second column G subpixel, and a second row and third column B subpixel.

8. The display apparatus of claim 7, wherein the display panel further includes:

a dummy data line connected to the first row R dummy pixel and the second row and first column B subpixel; and data lines, the data lines including:

a first data line connected to the first row and first column R subpixel and the second row and second column R subpixel, a second data line connected to the first row and first column G subpixel and the second row and first column G subpixel, a third data line connected to the first row and second column B subpixel and the second row and third column B subpixel, and a fourth data line connected to the first row and second column G subpixel and the second row and second column G subpixel.

9. The display apparatus of claim 8, wherein the display driver is configured to generate output data corresponding to the conversion data, and apply the output data to the subpixels of the display panel through the data lines.

10. The display apparatus of claim 9, wherein the output data corresponding to the first row and first column red conversion data are applied to the first row and first column R subpixel, wherein the output data corresponding to the first row and first column green conversion data are applied to the first row and first column G subpixel, wherein the output data corresponding to the first row and second column blue conversion data are applied to the first row and second column B subpixel wherein the output data corresponding to the first row and second column green conversion data are applied to the first row and second column G subpixel, wherein the output data corresponding to the first row and third column red conversion data are applied to the first row and third column R subpixel, wherein the output data corresponding to the second row dummy blue conversion data are applied to the second row and first column B subpixel, wherein the output data corresponding to the second row and first column green conversion data are applied to the second row and first column G subpixel, wherein the output data corresponding to the second row and first column red conversion data are applied to the second row and second column R subpixel, wherein the output data corresponding to the second row and second column green conversion data are applied to the second row and second column G subpixel, and wherein the output data corresponding to the second row and second column blue conversion data are applied to the second row and third column B subpixel.

11. A display apparatus comprising:

a display panel having a first pixel structure; and a display driver configured to receive input image data including first data, and generate a driving signal for driving the display panel based on conversion data, wherein the display driver includes a converter configured to convert the first data into the conversion data, wherein the conversion data include conversion data in N rows and M columns, wherein each of (2K−1)-th column conversion data include first color conversion data representing a blue color and second color conversion data representing a green color, wherein each of 2K-th column conversion data include third color conversion data representing a red color and fourth color conversion data representing the green color, wherein N, M and K are positive integers, wherein the input image data include a first row dummy red data, a first row dummy green data, a first row dummy blue data, a first row and first column red data, a first row and first column green data, a first row and first column blue data, a first row and second column red data, a first row and second column green data, a first row and second column blue data, a first row and third column red data, a first row and third column green data, and a first row and third column blue data, and wherein the conversion data include first row dummy red conversion data generated based on the first row dummy red data and the first row and first column red data, first row dummy green conversion data corresponding to the first row dummy green data, first row and first column blue conversion data generated based on the first row and first column blue data and the first row and second column blue data, first row and first column green conversion data corresponding to the first row and first column green data, first row and second column red conversion data generated based on the first row and second column red data and the first row and third column red data and first row and second column green conversion data corresponding to the first row and second column green data.

12. The display apparatus of claim 11, wherein the input image data further include second row dummy red data, second row dummy green data, second row dummy blue data, a second row and first column red data, a second row and first column green data, a second row and first column blue data, a second row and second column red data, a second row and second column green data, a second row and second column blue data, a second row and third column red data, a second row and third column green data, a second row and third column blue data, a second row and fourth column red data, a second row and fourth column green data, and a second row and fourth column blue data, and wherein the conversion data include second row dummy blue conversion data generated based on the second row dummy blue data and the second row and first column blue data, second row dummy green conversion data corresponding to the second row dummy green data, second row and first column blue conversion data generated based on the second row and first column blue data and the second row and second column blue data, second row and first column green conversion data corresponding to the second row and first column green data, second row and second column red conversion data generated based on the second row and first column red data and the second row and second column red data, second row and second column green conversion data corresponding to the second row and second column green data, and second row and third column blue conversion data generated based on the second row and third column blue data and the second row and fourth column blue data.

13. The display apparatus of claim 12, wherein the display panel includes a first row R dummy pixel, a second row B dummy pixel, a first row and first column R subpixel, a first row and first column G subpixel, a first row and second column B subpixel, a first row and second column G subpixel, a first row and third column R subpixel, a second row and first column B subpixel, a second row and first column G subpixel, a second row and second column R subpixel, a second row and second column G subpixel, and a second row and third column B subpixel.

14. The display apparatus of claim 13, wherein the display panel further includes:

a dummy data line connected to the first row and first column R subpixel and the second row B dummy pixel; and data lines, the data lines including:

a first data line connected to the first row and second column B subpixel and the second row and first column B subpixel;

a second data line connected to the first row and first column G subpixel and the second row and first column G subpixel;

a third data line connected to the first row and third column R subpixel and the second row and second column R subpixel; and a fourth data line connected to the first row and second column G subpixel and the second row and second column G subpixel.

15. The display apparatus of claim 14, wherein the display driver is configured to generate output data corresponding to the conversion data, and apply the output data to the subpixels of the display panel through the data lines.

16. The display apparatus of claim 15, wherein the output data corresponding to the first row dummy red conversion data are applied to the first row and first column R subpixel, wherein the output data corresponding to the first row and first column green conversion data are applied to the first row and first column G subpixel, wherein the output data corresponding to the first row and first column blue conversion data are applied to the first row and second column B subpixel, wherein the output data corresponding to the first row and second column green conversion data are applied to the first row and second column G subpixel, wherein the output data corresponding to the first row and second column red conversion data are applied to the first row and third column R subpixel, wherein the output data corresponding to the second row and first column blue conversion data are applied to the second row and first column B subpixel, wherein the output data corresponding to the second row and first column green conversion data are applied to the second row and first column G subpixel, wherein the output data corresponding to the second row and second column red conversion data are applied to the second row and second column R subpixel, wherein the output data corresponding to the second row and second column green conversion data are applied to the second row and second column G subpixel, and wherein the output data corresponding to the second row and third column blue conversion data are applied to the second row and third column B subpixel.

17. A method of driving a display apparatus, the method comprising:

receiving input image data including first data;

converting the first data into conversion data;

generating output data based on the conversion data; and applying the output data to a display panel to display an image, wherein the conversion data include conversion data in N rows and M columns, wherein each of (2K−1)-th column conversion data include first color conversion data representing a first color and second color conversion data representing a second color, wherein each of 2K-th column conversion data include third color conversion data representing a third color and fourth color conversion data representing the second color, wherein N, M and K are positive integers, wherein the input image data include second row dummy blue data and a second row and first column blue data, and wherein the conversion data include second row dummy blue conversion data generated based on the second row dummy blue data and the second row and first column blue data.

18. The method of claim 17, wherein the input image data further include second row dummy red data, second row dummy green data, a second row and first column red data, a second row and first column green data, a second row and second column red data, a second row and second column green data, a second row and second column blue data, a second row and third column red data, a second row and third column green data, and a second row and third column blue data, and wherein the conversion data further include second row dummy green conversion data corresponding to the second row dummy green data, second row and first column red conversion data generated based on the second row and first column red data and the second row and second column red data and second row and first column green conversion data corresponding to the second row and first column green data, second row and second column blue conversion data generated based on the second row and second column blue data and the second row and third column blue data and second row and second column green conversion data corresponding to the second row and second column green data.

19. The method of claim 18, wherein the input image data further include a first row dummy red data, a first row dummy green data, a first row dummy blue data, a first row and first column red data, a first row and first column green data, a first row and first column blue data, a first row and second column red data, a first row and second column green data, a first row and second column blue data, a first row and third column red data, a first row and third column green data, a first row and third column blue data, a first row and fourth column red data, a first row and fourth column green data and a first row and fourth column blue data, and wherein the conversion data further include first row dummy red conversion data generated based on the first row dummy red data and the first row and first column red data and first row dummy green conversion data corresponding to the first row dummy green data, first row and first column red conversion data generated based on the first row and first column red data and the first row and second column red data and first row and first column green conversion data corresponding to the first row and first column green data, first row and second column blue conversion data generated based on the first row and first column blue data and the first row and second column blue data and first row and second column green conversion data corresponding to the first row and second column green data, and first row and third column red conversion data generated based on the first row and third column red data and the first row and fourth column red data.

20. The method of claim 19, wherein the display panel includes a first row R dummy pixel, a second row B dummy pixel, a first row and first column R subpixel, a first row and first column G subpixel, a first row and second column B subpixel, a first row and second column G subpixel, a first row and third column R subpixel, a second row and first column B subpixel, a second row and first column G subpixel, a second row and second column R subpixel, a second row and second column G subpixel, and a second row and third column B subpixel.

* * * * *